# United States Patent

Liljestrand et al.

(10) Patent No.: US 9,523,299 B2
(45) Date of Patent: Dec. 20, 2016

(54) METHOD AND DEVICE PERTAINING TO COOLING OF DOSING UNITS OF SCR SYSTEMS

(75) Inventors: Andreas Liljestrand, Södertälje (SE); Per Bremberg, Södertälje (SE); Ulf Carlsson, Södertälje (SE); Lars Eriksson, Järna (SE)

(73) Assignee: SCANIA CV AB (SE)

( * ) Notice: Subject to any disclaimer, the term of this patent is extended or adjusted under 35 U.S.C. 154(b) by 92 days.

(21) Appl. No.: 13/704,656

(22) PCT Filed: Jun. 20, 2011

(86) PCT No.: PCT/SE2011/050786
§ 371 (c)(1),
(2), (4) Date: Jan. 24, 2013

(87) PCT Pub. No.: WO2011/162690
PCT Pub. Date: Dec. 29, 2011

(65) Prior Publication Data
US 2013/0118153 A1    May 16, 2013

(30) Foreign Application Priority Data

Jun. 21, 2010  (SE) ...................... 1050638

(51) Int. Cl.
*F01N 3/02*   (2006.01)
*F01N 3/20*   (2006.01)
*F01N 9/00*   (2006.01)

(52) U.S. Cl.
CPC ................ *F01N 3/02* (2013.01); *F01N 3/208* (2013.01); *F01N 9/00* (2013.01); *F01N 2610/02* (2013.01);
(Continued)

(58) Field of Classification Search
CPC ............ F01N 2610/1466; F01N 3/0253; F01N 2610/144; F01N 9/007; F01N 2900/1808; F01N 3/36; F01N 2610/02; Y02T 10/24
(Continued)

(56) References Cited

U.S. PATENT DOCUMENTS 5,606,856 A   3/1997  Linder et al. ................... 60/286
5,794,667 A   8/1998  Payne et al. ................... 141/128
(Continued)

FOREIGN PATENT DOCUMENTS

DE        199 47 197       4/2001
DE   10 2004 050 022       4/2006
(Continued)

OTHER PUBLICATIONS

Machine Translation of JP 2008169711 A.*
(Continued)

*Primary Examiner* — Kenneth Bomberg
*Assistant Examiner* — Brandon Lee
(74) *Attorney, Agent, or Firm* — Ostrolenk Faber LLP

(57) ABSTRACT

A method for cooling a dosing unit (250) pertaining to an SCR system for exhaust cleaning, wherein after cessation of exhaust flow, cooling a reducing agent dosing unit (250) by a reducing agent supplied to it. Also running a feed device to supply the coolant reducing agent at reduced power, compared with ordinary operation. A computer program product containing program code (P) for a computer (200; 210) implements a method of the invention. Also an SCR system and a motor vehicle which is equipped with the SCR system are disclosed.

17 Claims, 4 Drawing Sheets

(52) U.S. Cl.
CPC .... *F01N 2610/11* (2013.01); *F01N 2610/1453* (2013.01); *F01N 2610/1473* (2013.01); *F01N 2900/1812* (2013.01); *Y02T 10/24* (2013.01); *Y02T 10/47* (2013.01)

(58) Field of Classification Search
USPC .......................................... 60/274, 286, 295
See application file for complete search history.

(56) References Cited

U.S. PATENT DOCUMENTS

| | | | |
|---|---|---|---|
| 6,375,432 B1 | 4/2002 | Krasny et al. | 417/46 |
| 6,470,673 B1 | 10/2002 | van Nieuwstadt et al. | 60/286 |
| 7,454,922 B2 * | 11/2008 | Zeigler | B60H 1/00378 123/41.19 |
| 7,607,292 B2 | 10/2009 | Kobayashi | 60/286 |
| 8,302,394 B2 | 11/2012 | Ochi | 60/403 |
| 8,307,636 B2 | 11/2012 | Matsunaga | 60/286 |
| 2001/0020452 A1 * | 9/2001 | Suzuki et al. | 123/41.1 |
| 2003/0161947 A1 | 8/2003 | Tuyls et al. | 427/240 |
| 2004/0060286 A1 | 4/2004 | Huber et al. | 60/286 |
| 2006/0269807 A1 | 11/2006 | Fujita et al. | 429/26 |
| 2007/0289289 A1 * | 12/2007 | Kojima et al. | 60/286 |
| 2008/0022654 A1 | 1/2008 | Broderick et al. | 60/274 |
| 2008/0245058 A1 | 10/2008 | Boddy et al. | 60/286 |
| 2009/0205316 A1 | 8/2009 | Dougnier et al. | 60/274 |
| 2011/0083424 A1 | 4/2011 | Wang et al. | 60/277 |
| 2011/0146241 A1 | 6/2011 | Hodgson et al. | 60/274 |
| 2013/0104527 A1 | 5/2013 | Liljestrand et al. | 60/274 |
| 2013/0111880 A1 | 5/2013 | Liljestrand et al. | 60/274 |
| 2013/0111881 A1 | 5/2013 | Liljestrand et al. | 60/274 |
| 2013/0111882 A1 | 5/2013 | Eriksson et al. | 60/274 |
| 2013/0125532 A1 | 5/2013 | Eriksson et al. | 60/274 |

FOREIGN PATENT DOCUMENTS

| | | |
|---|---|---|
| DE | 10 2006 020 439 | 11/2007 |
| DE | 10 2007 000 666 | 7/2008 |
| DE | 10 2007 039 794 | 3/2009 |
| DE | 10 2008 030 756 | 1/2010 |
| DE | 10 2008 052 988 | 4/2010 |
| DE | 10 2009 056 181 | 6/2011 |
| JP | 58-210387 | 12/1983 |
| JP | 59-517 | 1/1984 |
| JP | H2-122906 | 10/1990 |
| JP | H6-159176 | 6/1994 |
| JP | 9-96212 | 4/1997 |
| JP | 2000-240436 | 9/2000 |
| JP | 2002-38941 | 2/2002 |
| JP | 2003-511599 | 3/2003 |
| JP | 2004-293494 | 10/2004 |
| JP | 2005-307769 | 11/2005 |
| JP | 2008-69731 | 3/2008 |
| JP | 2008-95570 | 4/2008 |
| JP | 2008169711 A * | 7/2008 |
| JP | 2008-220163 | 9/2008 |
| JP | 2009-006081 | 1/2009 |
| JP | 2009-526168 | 7/2009 |
| JP | 2010-133354 | 6/2010 |
| WO | WO 2007/091969 | 8/2007 |
| WO | WO 2007/124779 | 11/2007 |
| WO | WO 2007/124791 | 11/2007 |
| WO | WO 2008/149541 | 12/2008 |
| WO | WO 2009/053806 | 4/2009 |
| WO | WO 2009/156281 | 12/2009 |

OTHER PUBLICATIONS

International Search Report mailed Oct. 5, 2011 in corresponding PCT International Application No. PCT/SE2011/050786.
International Search Report mailed Oct. 6, 2011 in corresponding PCT International Application No. PCT/SE2011/050792.
International Search Report mailed Oct. 6, 2011 in corresponding PCT International Application No. PCT/SE2011/050789.
International Search Report mailed Oct. 5, 2011 in corresponding PCT International Application No. PCT/SE2011/050785.
International Search Report mailed Oct. 11, 2011 in corresponding PCT International Application No. PCT/SE2011/050802.
International Search Report mailed Oct. 11, 2011 in corresponding PCT International Application No. PCT/SE2011/050801.
English translation of Japanese Office Action dated Oct. 21, 2014 issued in JP 2013-516545.

* cited by examiner

METHOD AND DEVICE PERTAINING TO COOLING OF DOSING UNITS OF SCR SYSTEMS

CROSS-REFERENCE TO RELATED APPLICATIONS

The present application is a 35 U.S.C. §§371 national phase conversion of PCT/SE2011/050786, filed Jun. 20, 2011, which claims priority of Swedish Application No. 1050638-4, filed Jun. 21, 2010, the contents of which are incorporated by reference herein. The PCT International Application was published in the English language.

TECHNICAL FIELD

The present invention relates to a method pertaining to an SCR system for exhaust cleaning. The invention relates also to a computer program product containing program code for a computer for implementing a method according to the invention. The invention relates also to an SCR system for exhaust cleaning and a motor vehicle which is equipped with the SCR system.

BACKGROUND

Vehicles today use, for example, urea as reductant in SCR (selective catalytic reduction) systems which comprise an SCR catalyst with which said reductant and NOx gas can react and be converted to nitrogen gas and water. Various types of reductants may be used in SCR systems. AdBlue is an example of a commonly used reductant.

One type of SCR system comprises a container which holds a reductant. The SCR system also has a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines which are stored in a control unit of the vehicle. To make it easier to regulate the pressure when there are small or no dosing amounts, the system comprises also a return hose which runs back to the container from a pressure side of the system. This configuration makes it possible to cool the dosing unit by means of the reductant which, during cooling, flows from the container via the pump and the dosing unit and back to the container. The dosing unit is thus provided with active cooling. The return flow from the dosing unit to the container may be substantially constant and is not controlled or regulated by means of appropriate valves or such units.

As the dosing unit is situated adjacent to the vehicle's exhaust system which becomes warm during operation of the vehicle, e.g. depending on the load, there is risk of the dosing valve becoming overheated. Overheating of the dosing unit may entail degradation of its functionality, potentially impairing its performance.

The dosing unit comprises electrical components, certain of them being provided with a circuit card. Said circuit card may for example be adapted to controlling the dosing of AdBlue to the vehicle's exhaust system. For various reasons, these electrical components are sensitive to high temperatures. Too high temperatures of the dosing unit may result in degradation of the electrical components, potentially leading to expensive repairs at a service workshop. Moreover, the reductant present in the dosing unit may at least partly crystallise at too high temperatures, potentially leading to obstruction of the dosing unit. It is therefore of the utmost importance that the temperature of the dosing unit of the SCR system should not exceed a critical level.

Cooling the dosing unit of a vehicle's SCR system currently takes place continuously during the vehicle's ordinary operation as a result of the reductant circulating within the SCR system as indicated above. Cooling the dosing unit during operation of the vehicle currently works satisfactorily.

After operation of the vehicle a large amount of thermal energy caused by its operation is stored in primarily the exhaust system. This thermal energy may be led to the dosing unit from, for example, a silencer and the SCR catalyst and may warm the dosing unit to a temperature which exceeds a critical value.

When the vehicle is switched off and the exhaust flow in the exhaust system consequently ceases, the reductant dosing unit is cooled for a predetermined time, e.g. about 30 minutes, by said reductant in the same way as during ordinary operation.

This arrangement entails certain disadvantages. One is a relatively large amount of energy used to power the pump in the SCR system after the vehicle has been switched off. Any vehicle battery used to power the pump of the SCR system might thus be discharged or reach an undesirably low charge level.

Another disadvantage of the dosing unit being cooled in the same way as during ordinary operation is that the pump of the SCR system emits disturbing noise which for example a driver of the vehicle may find irritating, particularly when he/she has to sleep in the cab after a driving run or is in the immediate vicinity of the vehicle.

There is thus a need to improve current methods for cooling the dosing unit in the SCR system after the vehicle has been switched off, in order to reduce or eliminate the above disadvantages.

DE 102007000666 A1 describes a device for supply of reducing agent to an exhaust duct during catalytic exhaust cleaning and discusses cooling of an injection valve for reducing agent after the engine and consequently the exhaust flow have been switched off. The arrangement in DE 102007000666 A1 comprises a cooling jacket which for cooling purposes surrounds the injection valve and is adapted to having reducing agent flow through it.

SUMMARY OF THE INVENTION

An object of the present invention is to propose a novel and advantageous method for improving the performance of an SCR system.

Another object of the invention is to propose a novel and advantageous SCR system and a novel and advantageous computer program for improving the performance of an SCR system.

An object of the present invention is to propose a novel and advantageous method for effecting cooling of a dosing unit of an SCR system after cessation of an exhaust flow therein.

Another object of the invention is to propose a novel and advantageous SCR system and a novel and advantageous computer program for effecting cooling of a dosing unit of an SCR system after cessation of an exhaust flow in the SCR system.

A further object of the invention is to propose a method, a device and a computer program for reducing the risk that a dosing unit in an SCR system might become overheated after cessation of an exhaust flow in the SCR system.

A further object of the invention is to propose an alternative method, an alternative SCR system and an alternative computer program for reducing the risk that a dosing unit in an SCR system might become overheated after cessation of an exhaust flow in the SCR system.

These objects are achieved with a method for cooling a dosing unit pertaining to SCR systems for exhaust cleaning according to the disclosure herein.

An aspect of the invention proposes a method for cooling a dosing unit pertaining to SCR systems for exhaust cleaning, comprising, after cessation of exhaust flow, the step of cooling a reducing agent dosing unit by means of reducing agent supplied to it. The method comprises also the step of running a feed device to supply said coolant reducing agent at reduced operating power compared with ordinary operation. Said running at reduced power compared with ordinary operation refers to the feed device.

To minimise the impact upon the vehicle, a proposed function causes reduction of the pump speed of the feed device of the SCR system during cooling of the dosing unit after the cessation of said exhaust flow. This reduced pump speed is lower or substantially lower than that employed during ordinary operation of the SCR system, which ordinary operation comprises operation of the SCR system when the vehicle is in motion, or previous ordinary operation of the SCR system during cooling of the dosing unit after the cessation of said exhaust flow.

With advantage, a previous need for electrical energy from a battery of the vehicle when its engine is off during the subsequent cooling procedure is reduced.

Reducing the operating power of the feed device, with substantially unchanged cooling of the dosing unit, results in less noise than running the feed device at full power as previously. Part of the inventiveness of the present invention is that it has been found that the cooling of the dosing unit is reduced only marginally when the operating power of the feed device is reduced.

Despite the operating power of the feed device being reduced, with substantially unchanged cooling of the dosing unit, it is possible to avoid the reducing agent becoming crystallised as a result of too high temperatures and thereby causing obstruction of the dosing unit, potentially leading to expensive repairs of the SCR system.

Despite the operating power of the feed device being reduced, with substantially unchanged cooling of the dosing unit, temperature-related damage to the dosing unit's electrical components may with advantage be prevented.

Reducing the operating power of the feed device may entail running it at a lower speed than during ordinary operation. Reducing the power of the feed device may result in a lower pressure of the reducing agent towards the dosing unit than during ordinary operation.

According to an embodiment, the power of the feed device for said reducing agent is reduced in at least one stage to a level which results in substantially no change in the cooling of the dosing unit but uses substantially less energy than in the state of the art.

The method may comprise the step of running said feed device at least possible power, with substantially unchanged cooling of said dosing unit, for as long as cooling continues. With advantage, a cooling function is achieved whereby the cooling of said dosing unit is substantially unchanged but the impact of the SCR system is decreased in a desirable way.

The step of running said feed device may comprise running it at a power corresponding to 10-30% of that during ordinary operation. With advantage, this results in a substantial reduction in the amount of energy required for adequate cooling of the dosing unit of the SCR system. According to a preferred embodiment, the step of running said feed device may comprise running it at a power corresponding to less than 10% of that during ordinary operation. According to an embodiment, the innovative method may result in a total energy saving of 10-50% compared with cooling methods according to the state of the art.

The method may further comprise the step of running said feed device for a predetermined period of time after cessation of said exhaust flow. Any adequate period of time may be used such that cooling of the dosing unit can be switched off automatically when said period of time has passed after cessation of the exhaust flow.

The method may further comprise the step of running said feed device on the basis of a measured temperature of at least one portion of said SCR system. Any adequate temperature of said at least one portion of said SCR system may be used such that cooling of the dosing unit can be switched off automatically when said temperature of the at least one portion of said SCR system is reached after cessation of the exhaust flow.

Running said feed device may entail accounting for rewarming effects. Said predetermined period of time and said adequate temperature of the at least one portion of said SCR system may be predetermined by a computer model stored in a control unit of the vehicle on the basis of already known rewarming effects of the SCR system. The rewarming effects may be determined on the basis of predicted energy storage in the SCR system.

The method may further comprise the step of continuously running said feed device at reduced power compared with ordinary operation. The feed device is run continuously at reduced operating power until it is found that cooling of the dosing unit can be ended, whereupon the feed device is switched off. According to an embodiment, said feed device is run continuously, i.e. without stopping, at a constant or variable reduced operating power compared with ordinary operation. To this end, a relatively simple algorithm is proposed to run said feed device. This version results in an embodiment which is easy to develop and also results in very good predictability with regard to a future temperature pattern of the dosing unit.

The method is easy to implement in existing motor vehicles. Software pertaining to an SCR system for exhaust cleaning according to the invention may be installed in a control unit of the vehicle during the manufacture of the vehicle. A purchaser of the vehicle may thus have the possibility of selecting the function of the method as an option. Alternatively, software which comprises program code for applying the innovative method pertaining to an SCR system for exhaust cleaning may be installed in a control unit of the vehicle on the occasion of upgrading at a service station, in which case the software may be loaded into a memory in the control unit. Implementing the innovative method is therefore cost-effective, particularly since the vehicle need not be provided with any further components or subsystems. Relevant hardware is currently already provided in the vehicle. The invention therefore represents a cost-effective solution to the problems indicated above.

Software comprising program code for, after cessation of an exhaust flow, cooling a reducing agent dosing unit by means of reducing agent supplied to it, and for running a feed device to supply said coolant reducing agent at reduced power compared with ordinary operation, according to an aspect of the invention, is easy to update or replace. Moreover, different parts of the software containing program code for applying the innovative method may be replaced independently of one another. This modular configuration is advantageous from a maintenance perspective.

An aspect of the invention proposes an SCR system for exhaust cleaning which comprises a coolable dosing unit, which SCR system comprises:
  means for, after cessation of exhaust flow, cooling a reducing agent dosing unit by means of reducing agent intended to be supplied to it, and
  means for running a feed device to supply said coolant reducing agent at reduced power compared with ordinary operation.

The SCR system may comprise means for running said feed device at least possible power, with substantially unchanged cooling of said dosing unit, for as long as cooling continues.

Operation of said feed device may comprise running it at a power corresponding to 10-30% of that during ordinary operation.

The SCR system may further comprise means for running said feed device for a predetermined period of time after cessation of said exhaust flow.

The SCR system may further comprise means for running said feed device on the basis of a measured temperature of at least one portion of said SCR system.

Running said feed device may entail accounting for rewarming effects.

The SCR system may further comprise means for continuously running said feed device at reduced power compared with ordinary operation.

The above objects are also achieved with a motor vehicle which comprises the SCR system. The vehicle may be a truck, bus or passenger car.

An aspect of the invention proposes any platform which comprises an SCR system, e.g. a watercraft. The watercraft may be of any kind, e.g. a motorboat, a steamer, a ferry or a ship.

An aspect of the invention proposes a computer program pertaining to SCR systems for exhaust cleaning which contains program code for causing an electronic control unit or another computer connected to the electronic control unit to perform steps according to the disclosure herein.

An aspect of the invention proposes a computer program product containing a program code stored on a computer-readable medium for performing method steps according to the disclosure herein when said program is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which:

FIG. 2b illustrates schematically the components of a dosing unit shown in FIG. 2a;

DETAILED DESCRIPTION OF THE DRAWINGS

Figure 1:
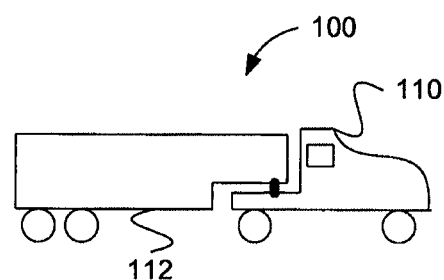
FIG. 1 illustrates schematically a vehicle according to an embodiment of the invention.

FIG. 1 depicts a side view of a vehicle 100. The exemplified vehicle 100 comprises a tractor unit 110 and a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method and the innovative device according to an aspect of the invention are well suited to other platforms which have an SCR system other than motor vehicles, e.g. watercraft. The watercraft may be of any kind, e.g. motorboats, steamers, ferries or ships.

The innovative method and the innovative SCR system according to an aspect of the invention are also well suited to, for example, systems which comprise industrial engines and/or engine-powered industrial robots.

The innovative method and the innovative SCR system according to an aspect of the invention are also well suited to various kinds of power plants, e.g. an electric power plant comprising a diesel generator.

The innovative method and the innovative SCR system are well suited to any engine system which comprises an engine and an SCR system, e.g. on a locomotive or some other platform.

The innovative method and the innovative SCR system are well suited to any system which comprises an NO generator and an SCR system.

The term "link" refers herein to a communication link which may be a physical connection such as an optoelectronic communication line, or a non-physical connection such as a wireless connection, e.g. a radio link or microwave link.

The term "line" refers herein to a passage for holding and conveying a fluid, e.g. a reductant in liquid form. The line may be a pipe of any suitable size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative SCR system are feasible with other types of reductants, subject to necessary adaptations, e.g. adaptations to adequate freezing points for chosen reductants, in control algorithms for executing software code in accordance with the innovative method.

Figure 2A:
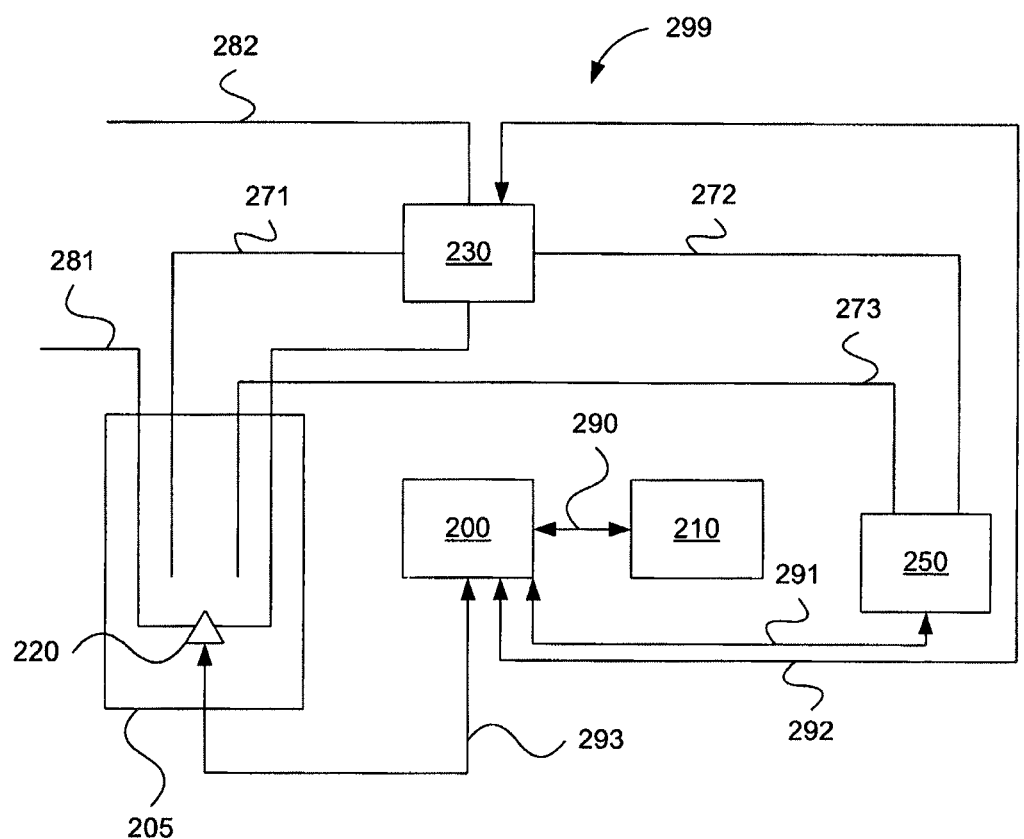
FIG. 2a illustrates schematically a subsystem for the vehicle depicted in FIG. 1, according to an embodiment of the invention.
Figure 2B:
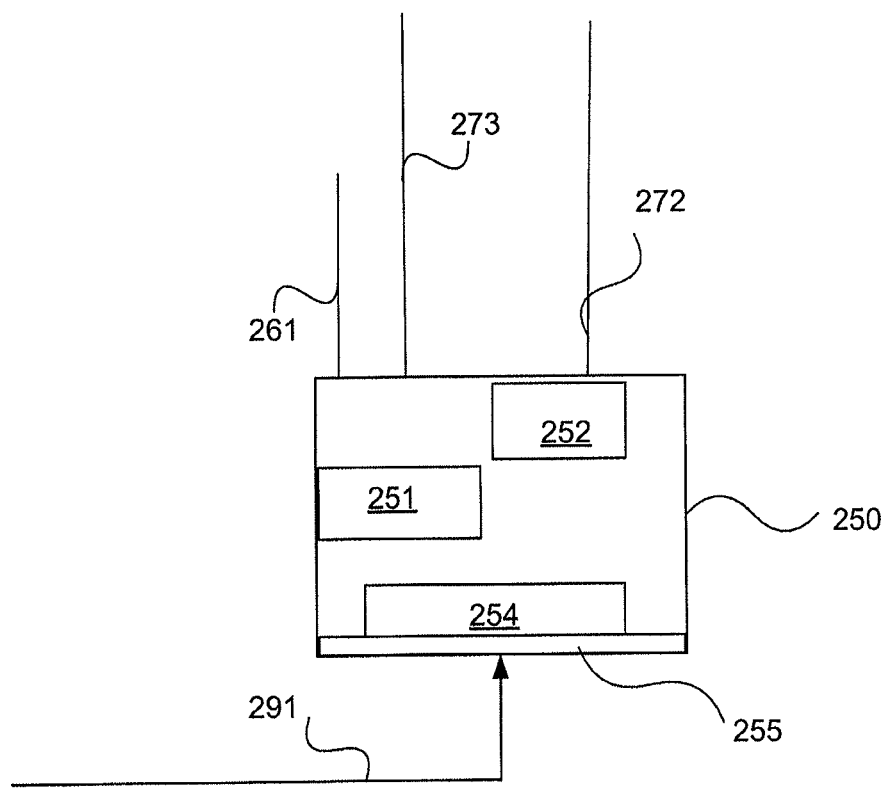

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and to being replenishable as necessary. The container might accommodate, for example, 75 or 50 liters of reductant.

A first line 271 is adapted to leading the reductant to a pump 230 from the container 205. The pump 230 may be any suitable pump. The pump 230 may be a diaphragm pump provided with at least one filter. The pump 230 is adapted to being driven by an electric motor. The pump 230 is adapted to drawing the reductant from the container 205 via the first line 271 and supplying it via a second line 272 to a dosing unit 250. The dosing unit 250 comprises an electrically controlled dosing valve 251 by means of which a flow of reductant added to the exhaust system can be controlled. The pump 230 is adapted to pressurising the reductant in the second line 272. The dosing unit 250 is provided with a throttle unit 252 against which said pressure of the reductant is built up in the subsystem 299.

The dosing unit 250 is adapted to supplying said reductant to an exhaust system (not depicted) of the vehicle 100. More specifically, the dosing unit 250 is adapted to supplying a suitable amount of reductant in a controlled way to an exhaust system of the vehicle 100. According to this version, an SCR catalyst (not depicted) is situated downstream of a location in the exhaust system where the reductant supply is effected. The amount of reductant supplied to the exhaust system is intended to be used in a conventional way in the SCR catalyst for reducing the amount of undesirable emissions.

The dosing unit 250 is situated adjacent to, for example, an exhaust pipe which is adapted to leading exhaust gases from a combustion engine (not depicted) of the vehicle 100 to the SCR catalyst. The dosing unit 250 is situated in thermal contact with the exhaust system of the vehicle 100. This means that thermal energy stored in, for example, an exhaust pipe, silencer and SCR catalyst can thus be led to the dosing unit.

The dosing unit 250 is provided with an electronic control card 254 which is adapted to handling communication with a control unit 200. The dosing unit 250 comprises also plastic and/or rubber components 255 which might melt or be otherwise adversely affected as a result of too high temperatures.

The dosing unit 250 is sensitive to temperatures above a certain value, e.g. 120 degrees Celsius. As for example the exhaust pipe, the silencer and the SCR catalyst of the vehicle 100 exceed this temperature value, there is risk that the dosing unit might become overheated during or after operation of the vehicle if not provided with cooling.

A third line 273 runs between the dosing unit 250 and the container 205. The third line 273 is adapted to leading back to the container 205 a certain amount of the reductant fed to the dosing valve 250. This configuration achieves with advantage cooling of the dosing unit 250. The dosing unit 250 is thus cooled by a flow of the reductant as it is pumped through the dosing unit 250 from the pump 230 to the container 205.

A first radiator liquid line 281 is adapted to holding and conveying coolant for an engine of the vehicle 100. The first radiator liquid line 281 is partly situated in the container 205 in order to warm the reductant present therein if the reductant is cold. In this example, the first radiator liquid line 281 is adapted to leading radiator liquid which has been warmed by the vehicle's engine in a closed circuit through the container 205, via the pump 230 and a second radiator liquid line 282 back to the engine of the vehicle 100. According to a version, the first radiator liquid line 281 is configured with a substantially U-shaped portion situated in the container 205, as schematically depicted in FIG. 2. This configuration achieves improved warming of the reductant in the container 205 when the reductant is at too low a temperature to function in a desirable way. It should be noted that the first radiator liquid line 281 may be of any suitable configuration. If the reductant is at a temperature which exceeds a predetermined value, warming of the reductant by the radiator liquid is deactivated automatically.

A first control unit 200 is arranged for communication with a temperature sensor 220 via a link 293. The temperature sensor 220 is adapted to detecting a prevailing temperature of the reductant where the sensor is fitted. According to this version, the temperature sensor 220 is situated at a bottom of the substantially U-shaped configuration of the first radiator liquid line 281. The temperature sensor 220 is adapted to continuously sending signals to the first control unit 200 which contain information about a prevailing temperature of the reductant.

According to an alternative, the temperature sensor 220 is situated adjacent to the dosing unit 250 in order to detect a prevailing temperature there. According to another version, the temperature sensor 220 is situated adjacent to the SCR catalyst of the SCR system in order to detect a prevailing temperature there. Any desired number of temperature sensors may be provided in the subsystem 299 to detect a prevailing temperature adjacent thereto. The temperature sensor/sensors 220 is/are adapted to detecting at a suitable location within the subsystem 299 a prevailing temperature which may serve as a basis for controlling operation of the pump 230 in order to cool the dosing unit by means of said flow of reductant.

The first control unit 200 is arranged for communication with the pump 230 via a link 292. The first control unit 200 is adapted to controlling operation of the pump 230 in order for example to regulate the reductant flows within the subsystem 299.

The first control unit 200 is arranged for communication with the dosing unit 250 via a link 291. The first control unit 200 is adapted to controlling operation of the dosing unit 250 in order for example to regulate the reductant supply to the exhaust system of the vehicle 100. The first control unit 200 is adapted to controlling operation of the dosing unit 250 in order for example to regulate the reductant return supply to the container 205.

The first control unit 200 is adapted, according to a version, to using the signals received which contain a prevailing temperature of the reductant in the region of the temperature sensor 220 and/or a prevailing temperature of any desired component of the SCR system or the subsystem 299 as a basis for controlling the pump 230 in accordance with an aspect of the innovative method. In particular, the first control unit 200 is adapted, according to a version, to using the signals received which contain a prevailing temperature of the reductant in the region of the temperature sensor 220 and/or a prevailing temperature of any desired component of the SCR system or the subsystem 299 as a basis for controlling operation of the pump 230 at reduced power compared with ordinary operation after cessation of an exhaust flow from the engine, in accordance with an aspect of the innovative method.

A second control unit 210 is arranged for communication with the first control unit 200 via a link 290. The second control unit 210 may be detachably connected to the first control unit 200. The second control unit 210 may be a control unit external to the vehicle 100. The second control unit 210 may be adapted to performing the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to performing substantially similar functions to those of the first control unit 200, e.g. using the signals received which contain a prevailing temperature of the reductant in the region of the temperature sensor 220 and/or a prevailing temperature of any desired component of the SCR system or the subsystem 299 as a basis for controlling operation of the pump 230 at reduced power compared with ordinary operation after cessation of an exhaust flow from the engine.

According to the embodiment schematically illustrated in FIG. 2, the first control unit 200 is adapted to controlling operation of the pump 230 at reduced power compared with ordinary operation after cessation of an exhaust flow from the engine in such a way that any amount of electrical energy which may be needed for cooling the dosing unit 250 to a critical temperature with regard to safety is less than in the state of the art.

Figure 3A:
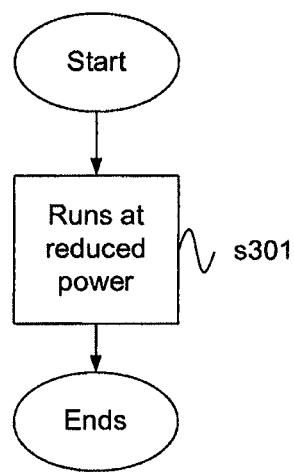
FIG. 3a is a schematic flowchart of a method according to an embodiment of the invention.

FIG. 3a is a schematic flowchart of a method for cooling a dosing unit pertaining to SCR systems for exhaust cleaning, according to an embodiment of the invention. The method comprises a first step s301. Method step s301 comprises the steps, after cessation of exhaust flow, of cooling a reducing agent dosing unit by means of reducing agent supplied to the dosing unit, and of running a feed device to supply said reducing agent at reduced power compared with ordinary operation. The method ends after step s301.

Figure 3B:
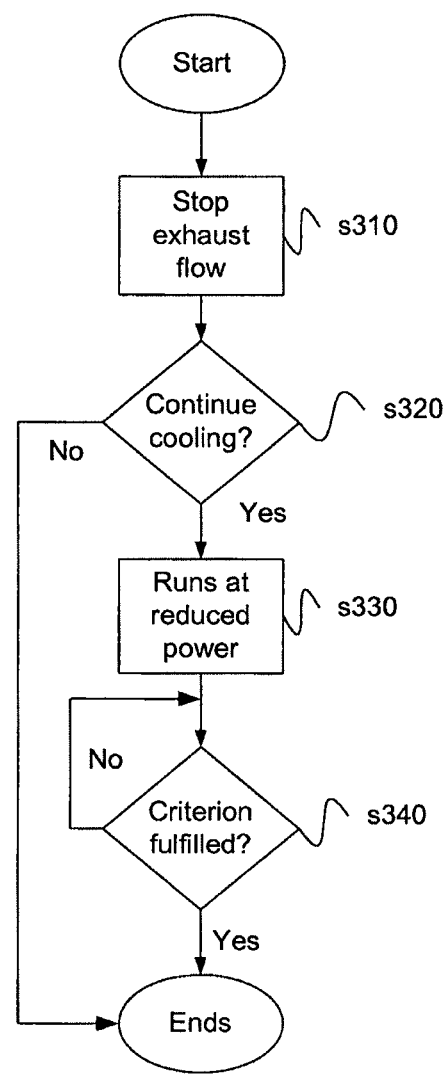
FIG. 3b is a more detailed schematic flowchart of a method according to an embodiment of the invention.

FIG. 3b is a schematic flowchart of a method for cooling a dosing unit pertaining to SCR systems for exhaust cleaning, according to an embodiment of the invention.

The method comprises a first step s310. Method step s310 comprises the step of shutting off an exhaust flow from a combustion engine of the vehicle 100. At this stage, the dosing unit 250 is cooled in an ordinary way, i.e. at an operating power of the pump 230 which is needed to maintain the same cooling flow of the dosing unit as during ordinary operation. Shutting off the exhaust flow is effected by switching off the engine of the vehicle 100. Step s310 is followed by a step s320.

Method step s320 comprises the step of evaluating whether there is a continuing need to cool the dosing unit by means of a flow of the reductant in the SCR system. The step of deciding whether there is a need to continue said cooling may be based on various parameters. According to an example, deciding whether there is a continuing need for cooling is based on the signals from the temperature sensor 220 which contain information about a prevailing temperature of at least one component of the SCR system or the subsystem 299 of the vehicle 100. If there is no continuing need for cooling, the method ends. If there is a continuing need for cooling, a subsequent step s330 is performed.

Method step s330 comprises the step of influencing the operation of the pump 230 in such a way that it is run at a reduced power compared with ordinary operation. According to an example, the pump 230 is run at a power which according to an example corresponds to about 10% of that employed for maintaining a cooling flow of the dosing unit 250 during ordinary operation. According to an example, the pump 230 is run at a power corresponding to less than 10% of that employed during ordinary operation. According to another example, the pump 230 is run at a power corresponding to 10-30% of that employed during ordinary operation. According to an example, the pump is run continuously at a reduced power compared with that employed during ordinary operation. Step s330 is followed by a step s340.

Method step s340 comprises the step of deciding whether a predetermined criterion is fulfilled. The predetermined criterion may be any desired criterion. Said criterion may be related to a predetermined period of time after cessation of said exhaust flow. Said criterion may be related to a measured temperature of at least one portion of said SCR system. Said criterion may be related to rewarming effects of at least one portion of said SCR system. The predetermined criterion may thus be fulfilled if a certain time has passed since operating the feed device at reduced power began, in which case it may be assumed that the dosing unit 250 has reached a desired temperature at which it needs no further cooling. If a predetermined temperature of at least one portion of the SCR system is reached, it may be assumed that the dosing unit 250 has reached a desired temperature at which it needs no further cooling. If it is decided at step s340 that the predetermined criterion is fulfilled, the method ends. If it is decided at step s340 that the predetermined criterion is not fulfilled, operation of the pump 230 continues at reduced power compared with ordinary operation, and step s340 is performed again. The method ends after step s340.

Figure 4:
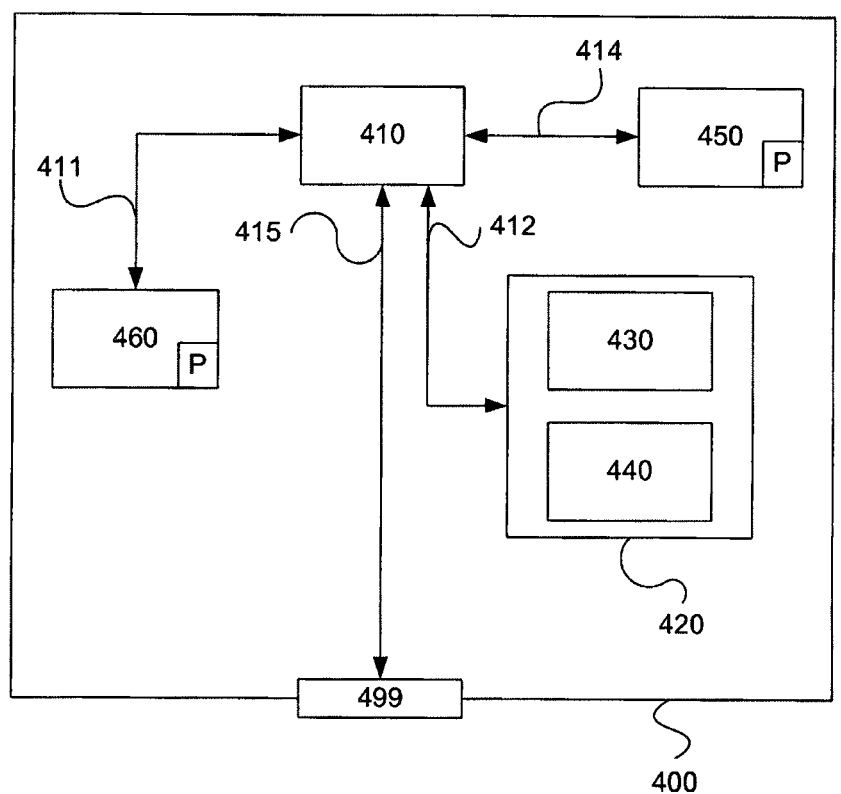
FIG. 4 illustrates schematically a computer according to an embodiment of the invention.

FIG. 4 is a diagram of a version of a device 400. The control units 200 and 210 described with reference to FIG. 2 may in a version comprise the device 400. The device 400 comprises a non-volatile memory 420, a data processing unit 410 and a read/write memory 450. The non-volatile memory 420 has a first memory element 430 in which a computer program, e.g. an operating system, is stored for controlling the function of the device 400. The device 400 further comprises a bus controller, a serial communication port, I/O means, an A/D converter, a time and date input and transfer unit, an event counter and an interruption controller (not depicted). The non-volatile memory 420 has also a second memory element 440.

A proposed computer program P comprises routines, after cessation of exhaust flow, for cooling a reducing agent dosing unit by means of reducing agent supplied to it, and for running a feed device to supply said coolant reducing agent at reduced power compared with ordinary operation, according to the innovative method. The program P may be stored in an executable form or in a compressed form in a memory 460 and/or in a read/write memory 450.

Where the data processing unit 410 is described as performing a certain function, it means that the data processing unit 410 effects a certain part of the program stored in the memory 460, or a certain part of the program stored in the read/write memory 450.

The data processing device 410 can communicate with a data port 499 via a data bus 415. The non-volatile memory 420 is intended for communication with the data processing unit 410 via a data bus 412. The separate memory 460 is intended to communicate with the data processing unit 410 via a data bus 411. The read/write memory 450 is adapted to communicate with the data processing unit 410 via a data bus 414. The data port 499 may for example have the links 290, 291, 292 and 293 connected to it (see FIG. 2).

When data are received on the data port 499, they are stored temporarily in the second memory element 440.

When input data have been stored temporarily, the data processing unit 410 is prepared to effect code execution as described above. According to a version, signals received on the data port 499 contain information about a prevailing temperature of at least one portion of the SCR system. The signals received on the data port 499 may be used by the device 400 to run the pump 230 according to an aspect of the invention.

Parts of the methods herein described may be effected by the device 400 by means of the data processing unit 410 which runs the program stored in the memory 460 or the read/write memory 450. When the device 400 runs the program, methods herein described are executed.

An aspect of the invention proposes a computer program pertaining to SCR systems for exhaust cleaning which contains program code stored on a computer-readable medium for, after cessation of exhaust flow, causing an electronic control unit or another computer connected to the electronic control unit to cool a reducing agent dosing unit by means of reducing agent supplied to it, and to run a feed device to supply said coolant reducing agent at reduced power compared with ordinary operation.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method for cooling a reducing agent dosing valve pertaining to an SCR system for exhaust cleaning of a combustion engine exhaust of a combustion engine of a motor vehicle, said combustion engine producing exhaust flow during operation, wherein the dosing valve is located generally at the exhaust flow;
the method comprising performing the steps of:
after the cessation of exhaust flow, by stopping of operation of said combustion engine, operating a pump to cool said reducing agent dosing valve by said pump supplying reducing agent to said dosing valve;
after the cessation of said exhaust flow, reducing a power at which said pump is operated to supply said reducing agent, said reduced power of said pump being reduced by an electronic control unit, said reduced power of said ump being reduced compared with a level of power of said pump when said pump is operated while said combustion engine is operating,
pumping coolant for said combustion engine through a line passing through a container of said reducing agent by said pump, and
warming said reducing agent,
wherein said pumping of said coolant and said warming of said reducing agent is performed when a temperature of said reducing agent in said container is less than or equal to a predetermined value.

2. The method according to claim 1, wherein the step of reducing said power at which said pump is operated to supply said reducing agent comprises:
running said pump at a least possible power, and with an unchanged amount of cooling of said reducing agent dosing valve, for as long as cooling continues.

3. The method according to claim 1, wherein said step of reducing said power at which said pump is operated to supply said reducing agent comprises running said pump at a power corresponding to 10-30% of said level of power of said pump when said pump is operated while said combustion engine is operating.

4. The method according to claim 1, wherein:
said step of reducing said power at which said pump is operated to supply said reducing agent is performed for a predetermined period of time after cessation of said exhaust flow.

5. The method according to claim 1, wherein the method comprises performing a further step of:
measuring a temperature of at least one portion of said SCR system, and
wherein said step of reducing said power at which said pump is operated to supply said reducing agent is performed on the basis of said measured temperature.

6. The method according to claim 4, wherein said step of reducing said power at which said pump is operated to supply said reducing agent entails accounting for rewarming effects.

7. The method according to claim 1, wherein said step of reducing said power at which said pump is operated to supply said reducing agent comprises:
continuously running said pump at said reduced power.

8. An SCR system configured to clean combustion engine exhaust of a combustion engine of a motor vehicle, said combustion engine being configured to produce exhaust flow during operation and to cease said exhaust flow after operation;
the SCR system comprising:
a reducing agent dosing unit comprising a dosing valve, said reducing agent dosing unit being located adjacent to an exhaust pipe leading said exhaust flow from said combustion engine;
a container containing said reducing agent;
a temperature sensor located in said container configured to detect a temperature of said reducing agent in said container;
a pump configured to supply said reducing agent to said reducing agent dosing unit from said container;
a first line configured to convey coolant for said combustion engine from said combustion engine through said container and to said pump;
a second line configured to convey said coolant for said combustion engine from said pump to said combustion engine; and
an electronic control unit configured to control said pump to operate at a reduced power after cessation of said exhaust flow compared with a level of power at which said pump is run when said combustion engine is operating, said reduced power being selected based on at least said temperature of said reducing agent in said container detected by said temperature sensor,
wherein said pump pumps said coolant for said combustion engine through said first line and said second line to warm said reducing agent when said temperature of said reducing agent in said container detected by said temperature sensor is less than or equal to a predetermined value.

9. The SCR system according to claim 8, wherein:
said electronic control unit is configured and operable for running said pump at a least possible power, with an unchanged amount of cooling of said reducing agent dosing unit for as long as said pump is operated.

10. The SCR system according to claim 8, wherein said electronic control unit runs said pump at a power corresponding to 10-30% of said level of power at which said pump is run when said combustion engine is operating.

11. The SCR system according to claim 8, wherein:
said electronic control unit is configured to run said pump for a predetermined period of time after cessation of said exhaust flow.

12. The SCR system according to claim 8, wherein:
said electronic control unit is configured to run said pump on the basis of at least a measured temperature of at least one portion of said SCR system.

13. The SCR system according to claim 8, wherein said pump is configured to account for rewarming effects.

14. The SCR system according to claim 8, wherein:
said electronic control unit is configured to continuously run said pump at said reduced power.

15. The SCR system according to claim 8, wherein said electronic control unit or another computer connected to said electronic control unit performs program instructions in program code, said program code with said program instructions being stored on a non-transitory computer-readable medium, and the SCR system further comprises a computer program product which comprises said non-transitory computer-readable medium storing said program code with said program instructions, and wherein said electronic control unit or said computer is configured to control said pump by said program code stored on said non-transitory computer readable medium.

16. A system comprising:
a motor vehicle; and
an SCR system according to claim 8.

17. The system according to claim 16, wherein the motor vehicle comprises one of a truck, bus or passenger car.

* * * * *